July 29, 1924.

E. G. GOODWIN

SIX-WHEEL CAR TRUCK

Filed June 21, 1921

INVENTOR
E. G. Goodwin

Patented July 29, 1924.

1,502,988

UNITED STATES PATENT OFFICE.

ERNEST G. GOODWIN, OF NEW YORK, N. Y., ASSIGNOR TO JOHN A. PILCHER, OF ROANOKE, VIRGINIA.

SIX-WHEEL CAR TRUCK.

Application filed June 21, 1921. Serial No. 479,329.

*To all whom it may concern:*

Be it known that I, ERNEST G. GOODWIN, a citizen of the United States, residing in the city of New York, State of New York, have invented certain new and useful Improvements in Six-Wheel Car Trucks, of which the following is a specification.

This invention relates to six-wheel car trucks, and has among its objects to provide improved means for the distribution of the superimposed car body loads among the various wheels of the truck. In general heretofore it has been the custom in six-wheel car trucks to transfer the superimposed car body loads to the wheels through two or more side-frame sections at either side of the truck. One object of my invention is to transfer a predetermined portion of the superimposed car body load to the wheels through two side-frame sections, one at either side of the truck, and the remaining portion to the wheels direct from a load receiving equalizing member. Other objects are to provide a truck with easy access for inspection and one of minimum weight.

With the foregoing general objects and other incidental ones in view, the invention consists of the formation, combination and arrangement of the various elements as herewith described and finally claimed.

Figure 1:
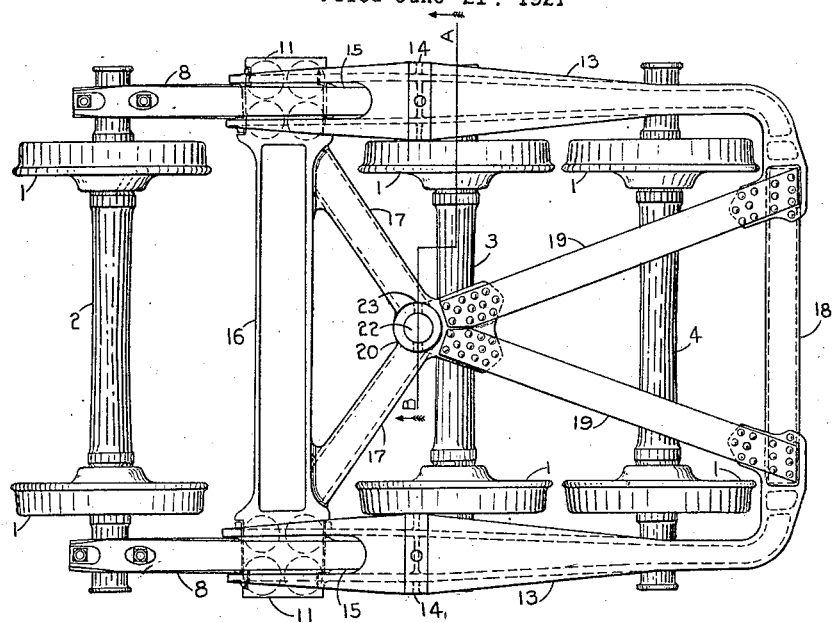
Figure 2:
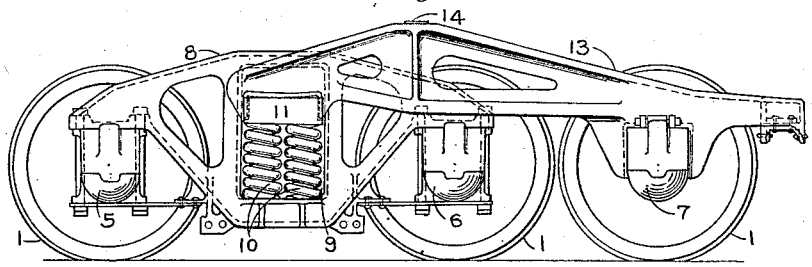
Figures 3, 4, 5:
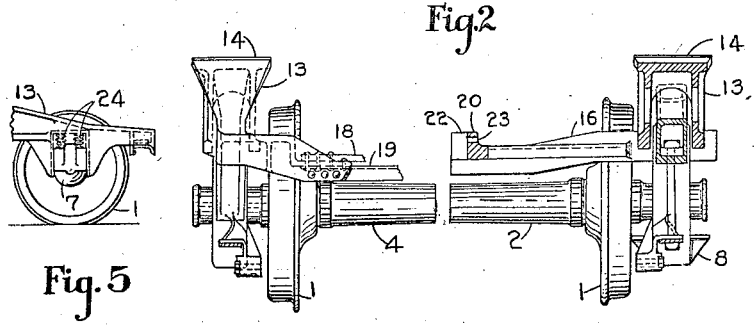

In the drawings, Figure 1 is a plan view of a truck embodying the features of the present invention, and Figure 2 is a side elevation view of the same. Figure 3 is a half-end elevation view and Figure 4 is a half-transverse vertical section taken approximately on the line A—B of Figure 1, with the middle axle, wheel and oil box removed. Figure 5 is a broken side-elevational view with certain modifications shown therein that will be hereinafter described.

Referring now to the drawings, wherein like parts are similarly designated, 1—1 (etc.) represent the wheels mounted in the customary manner to the axles 2, 3 and 4 respectively. The ends of the axles 2, 3 and 4 are journaled in the oil boxes 5, 6 and 7 respectively, the arrangement of the parts of these oil boxes and their bearings being of any approved form. I consider it preferable, however, that the oil boxes 5 and 6 should be of the rigid type, while the boxes 7 should be of the pedestal, or vertical-sliding type.

Disposed at the sides of the truck without the lines of the truck wheels 1 and spanning the distance between the oil boxes 5 and 6 and supported by these oil boxes are the side-frame sections 8, to which are rigidly secured the oil boxes 5 and 6 in any of the customary manners. Each of the side-frame sections 8 has the customary window openings 9, with the load-carrying springs 10 positioned therein and supported by the said side-frame sections. The springs 10 are so located longitudinally along the side-frame sections that any load applied thereto will be equally divided between the axles 2 and 3.

Disposed within the openings 9 of the side-frame sections 8, and guided by the sides of the said openings, are the spring caps 11, supported by the springs 10. The spring caps 11 may be formed integral with or rigidly secured to the direct cross member 16.

At either side of the truck disposed without the lines of the truck wheels are the load-receiving equalizing members 13, with their load-receiving seats 14, so located longitudinally thereon that a desired portion of the superimposed load will be transmitted to the side-frame sections 8 through the spring caps 11 and the springs 10. The remaining portion of the load will be transmitted direct to the axle 4 through the oil boxes 7. Each of the load-receiving equalizing members 13 is preferably cast in a single piece with one end bifurcated at 15 to receive the side-frame sections 8, and the other end formed to receive the oilbox 7.

For holding the side-frame sections 8 and the load-receiving equalizing members 13 in constant relationship, both horizontally and longitudinally, there is provided a built-up brace member of cast and structural steel, consisting of the direct cross members 16 and 18 and the X members 17 and 19. The direct cross member 16, together with its spring caps 11 and the X members 17, are preferably cast integral with the pivoting member 20. The direct cross member 18, together with the X members 19, are preferably of rolled sections. The direct cross member 18 is rigidly secured to the load-receiving equalizing members 13. The X members 19 are rigidly secured at one extremity to the pivoting member 20 and at the other extremity to the direct cross member 18 and the load-receiving equalizing members 13.

The bifurcated ends of the load-receiving equalizing members, together with the side-frame sections, are operatively connected by the direct cross member 16. The other extremities of the said load-receiving equalizing members are connected by the other direct cross member 18, and the two direct cross members are connected to each other by the X members 17 and 19. Thus the said built-up brace member, the side-frame sections and the load-receiving equalizing members are all operatively connected together. The direct cross member 18 and the X members 19 being of rolled sections, the bifurcated end of either load-receiving equalizing member may be moved without the general horizontal plane of the built-up brace member.

The pivoting member 20 is provided with a vertical opening 22 to receive a trunnion (not shown in the drawings) which depends from the car body. A bolt is passed through the horizontal opening 23 in the pivoting member 20, whereby the car and truck are kept from being separated in case of derailment. It will be readily seen that the function of the pivoting member 20 is for swiveling and guiding purposes only and to prevent horizontal displacement between the truck and car body.

In Figure 5 I have shown also an alternative method of supporting one end of the said load-receiving equalizing members by interposing the springs 24 between the said load-receiving equalizing members and the oil boxes 7.

I have thus provided an improved method of distributing the superimposed car body loads among the various wheels of the truck and at the same time provide a truck with easy access for inspection, lower first cost, less weight and one meeting all the requirements of successful commercial operation.

The terms and expressions which I have employed are used as terms of description and not of limitation, and I have no intention in the use of such terms and expressions of excluding any mechanical equivalents of features described and shown, or portions thereof, but recognize that various structural modifications are possible within the scope of the invention claimed.

Having thus described a preferred embodiment of my invention, what I claim is:

1. In a six-wheel car truck, a pair of side frames disposed without the lines of the truck wheels and resting on the oil boxes of two adjacent axles, a pair of load-receiving equalizing members disposed without the lines of the truck wheels, one end of said load-receiving equalizing members being supported by said side frames and the other end by the oil boxes of the third axle, all of the superimposed car body loads being transmitted direct to said load receiving equalizing members.

2. In a six-wheel car truck, a pair of side frames disposed without the lines of the truck wheels and resting on the oil boxes of two adjacent axles, a pair of load-receiving equalizing members disposed without the lines of the truck wheels to which all of the superimposed car body loads are transmitted, one end of said load-receiving equalizing members being supported by said side frames and the other end by the oil boxes of the third axle, the load-receiving equalizing members having load-receiving seats thereon so disposed longitudinally that two-thirds of the superimposed load will be transmitted to the said side frames and the remaining one-third to the oil boxes of the third axle.

3. In a six-wheel car truck, a pair of side frames disposed without the lines of the truck wheels and resting on the oil boxes of two adjacent axles, a pair of load-receiving equalizing members disposed without the lines of the truck wheels to which all of the superimposed car body loads are transmitted, one end of said load-receiving equalizing members being supported by said side frames at a point substantially longitudinally midway between the said two adjacent axles, and the other end supported by the oil boxes of the third axle.

4. In a six-wheel car truck, a pair of side frames disposed without the lines of the truck wheels, and resting on the oil boxes of two adjacent axles, a pair of load-receiving equalizing members disposed without the lines of the truck wheels to which all of the superimposed car body loads are transmitted, one end of said load-receiving equalizing members being formed to receive the said side frames and the other end being formed to receive the oil boxes of the third axle.

5. In a six-wheel car truck, a pair of side frames disposed without the lines of the truck wheels and resting on the oil boxes of two adjacent axles, a pair of load-receiving equalizing members disposed without the lines of the truck wheels to which all of the superimposed car body loads are transmitted, one end of said load-receiving equalizing members being supported by said side frames and the other end by the oil boxes of the third axle, a horizontal-brace member operatively connected to the said load-receiving equalizing members.

6. In a six-wheel car truck, a pair of side frames disposed without the lines of the truck wheels and resting on the oil boxes of two adjacent axles, a pair of load-receiving equalizing members disposed without the lines of the truck wheels, one end of said load-receiving equalizing members being supported by said side frames and the other end by the oil boxes of the third axle, a horizontal-brace member operatively connected to the said load-receiving equalizing members and operatively connecting the said load-receiving equalizing members to the said side frames.

7. In a six-wheel truck for railway cars, the combination with a plurality of wheels, axles, bearings and oil boxes, of side frames disposed without the lines of the truck wheels and resting on the oil boxes of two adjacent axles, a pair of load-receiving equalizing members disposed without the lines of the truck wheels to which all of the superimposed car body loads are transmitted, one end of said load-receiving equalizing members being yieldably supported by said side frames and the other end being supported by the oil boxes of the third axle.

8. In a six-wheel car truck, a pair of side frames disposed without the lines of the truck wheels and resting on the journals of two adjacent axles, a pair of load-receiving equalizing members disposed without the lines of the truck wheels to which all of the superimposed car body loads are transmitted, one end of said load-receiving equalizing members being supported by said side frames and the other end by the journals of the third axle.

9. In a six-wheel car truck, a pair of side frames disposed without the lines of the truck wheels, and resting on the oil boxes of two adjacent axles, a pair of load-receiving equalizing members disposed without the lines of the truck wheels to which all of the superimposed car body loads are transmitted, one end of said load-receiving equalizing members being supported by said side frames, and the other end by the oil boxes of the third axle, the load-receiving equalizing members having load-receiving seats thereon, so disposed longitudinally that a desired portion of the superimposed car body loads will be transmitted to the said side frames and the remaining portion to the oil boxes of the third axle.

10. In a six-wheel car truck, a pair of side frames disposed without the lines of the truck wheels and resting on the oil boxes of two adjacent axles, a pair of load-receiving equalizing members disposed without the lines of the truck wheels to which all of the superimposed car body loads are transmitted, a horizontal-brace member operatively connected to one end of the said load-receiving equalizing members and operatively connecting the other end of said load-receiving equalizing members and said side frame sections together, the said horizontal-brace member being so constructed that the ends of the said load-receiving equalizing members are yieldable in a vertical plane.

11. In a six-wheel car truck, a pair of side frames disposed without the lines of the truck wheels and resting on the oil boxes of two adjacent axles, a pair of load-receiving equalizing members disposed without the lines of the truck wheels to which all of the superimposed car body loads are transmitted, one end of said load-receiving equalizing members being supported by the said side frames and the other end by the oil boxes of the third axle, the said load-receiving equalizing members being disposed above the oil boxes of the truck.

12. In a six-wheel car truck, a pair of side frames disposed without the lines of the truck wheels and resting on the oil boxes of two adjacent axles, a pair of load-receiving equalizing members disposed without the lines of the truck wheels to which all of the superimposed car body loads are transmitted, one end of said load-receiving equalizing members being supported by said side frames and the other end resting on top of the oil boxes of the third axle.

13. In a six-wheel truck for railway cars, the combination with a plurality of wheels, axles, bearings and oil boxes, of side frames disposed without the lines of the truck wheels and resting on the oil boxes of two adjacent axles, a pair of load - receiving equalizing members disposed without the lines of the truck wheels, one end of said load-receiving equalizing members being yieldably supported by said side frames and the other end being yieldably supported by the oil boxes of the third axle.

14. In a six-wheel car truck, the combination with a plurality of axles of a pair of side frames disposed without the lines of the truck wheels and resting on the oil boxes of two adjacent axles, a pair of load-receiving equalizing members disposed without the lines of the truck wheels, one end of said load-receiving equalizing members being supported by said side frames and the other end by the oil boxes of the third axle, springs interposed between said load-receiving equalizing members and said side frames.

15. In a six-wheel car truck, the combination with a pair of side-frame sections disposed without the lines of the wheels of a pair of load-receiving equalizing members. disposed without the lines of the wheels to which all of the superimposed car body loads are transmitted, a brace member, the said side-frame sections and the said load-receiving equalizing members being positioned laterally by the said brace member.

16. In a six-wheel truck, side frames supported on four of the wheels and each including a longitudinal upper member, a transom extending through said frames beneath said members, and body supporting arches each supported at one end on one of the other two wheels and at its other end straddling said member and supported on said transom.

17. In a six-wheel truck, side frames carried by four wheels of the truck, a transom yieldingly mounted on said frames, arches carried by said transom and the other two wheels of the truck, a transom carried by said arches and said first-mentioned transom and provided with a king pin bearing.

18. A six-wheel truck comprising two axles, side frames mounted thereon, a transom supported on and spacing said side frames, a third axle, arches supported on said transom and said axle, a second transom spacing said arches and united to said first-mentioned transom, and bearings for the car body on said arches.

19. In a six-wheel truck, side frames mounted on two wheels on each side of the truck and connected by a transom, arches from each of said side frames to the third wheel on the respective sides of the truck, and connected by a transom, said transoms being connected together intermediate their ends.

20. In a six-wheel car truck, the combination with a pair of side-frame sections disposed without the lines of the truck wheels, of a pair of load-receiving equalizing members disposed without the lines of the truck wheels, a brace member, the said side-frame sections being operatively connected to the said brace member by the said load-receiving equalizing members.

21. In a six-wheel car truck, the combination with a pair of side frames, of a pair of load-receiving equalizing members, the said side frames having window openings with springs and spring caps positioned therein, the said side frames being operatively connected to one end of the said load-receiving equalizing members by the said spring caps.

22. In a six-wheel car truck, the combination with a pair of side frames, of a pair of load-receiving equalizing members, a brace member, the said side frames and the said load-receiving equalizing members being disposed without the lines of the truck wheels and detachably connected to the said brace member.

In testimony whereof I affix my signature.

ERNEST G. GOODWIN.